(12) United States Patent
Koch et al.

(10) Patent No.: US 8,979,702 B2
(45) Date of Patent: Mar. 17, 2015

(54) CONFIGURATION FOR COMPACT PLANETARY TRANSMISSION

(75) Inventors: Thomas Koch, Green Valley, AZ (US);
Justin Floro, East Peoria, IL (US);
Michael Gross, Peoria, IL (US); Kevin Meyer, Germantown Hills, IL (US);
Kevin Knox, Peoria, IL (US); James Rice, Deer Creek, IL (US); James Elmer Winzeler, East Peoria, IL (US);
Peter Hodges, Peoria, IL (US); Perry Cruce, Marquette Heights, IL (US)

(73) Assignee: Caterpillar Inc., Peoria, IL (US)

( * ) Notice: Subject to any disclaimer, the term of this patent is extended or adjusted under 35 U.S.C. 154(b) by 323 days.

(21) Appl. No.: 13/540,308

(22) Filed: Jul. 2, 2012

(65) Prior Publication Data

US 2014/0004990 A1 Jan. 2, 2014

(51) Int. Cl.
*F16H 3/62* (2006.01)
*F16H 3/66* (2006.01)

(52) U.S. Cl.
CPC .......... *F16H 3/66* (2013.01); *F16H 2200/0047* (2013.01); *F16H 2200/0095* (2013.01); *F16H 2200/2012* (2013.01); *F16H 2200/2046* (2013.01)

USPC ............................................. 475/286; 475/290

(58) Field of Classification Search
USPC .................................... 475/271, 286, 290, 296
See application file for complete search history.

(56) References Cited

U.S. PATENT DOCUMENTS

| | | | | |
|---|---|---|---|---|
| 3,971,268 A | * | 7/1976 | Murakami et al. | 475/276 |
| 4,046,031 A | * | 9/1977 | Ott et al. | 475/286 |
| 7,963,876 B2 | | 6/2011 | Phillips | |
| 8,088,033 B2 | | 1/2012 | Boss et al. | |
| 8,506,443 B2 | * | 8/2013 | Seo et al. | 475/280 |
| 8,517,885 B2 | * | 8/2013 | Shim et al. | 475/276 |
| 2014/0038768 A1 | * | 2/2014 | Koch et al. | 475/275 |

* cited by examiner

*Primary Examiner* — Jacob S Scott
(74) *Attorney, Agent, or Firm* — Miller, Matthias & Hull LLP

(57) ABSTRACT

A compact five-speed transmission planetary hear train includes a first, second, third, and fourth planetary gear sets between an input and an output as well as first, second, and third brakes and first, second and third clutches. The first, second and third brakes and first, second and third clutches are selectively actuatable to provide five different forward speeds and four different reverse speeds between the input and the output.

15 Claims, 14 Drawing Sheets

|       |      | Clutches    |           |           | Brakes     |             |           |
|-------|------|-------------|-----------|-----------|------------|-------------|-----------|
| Ratio | Gear | Second (50) | Third (51)| First (49)| Third (48) | Second (47) | First (46)|
| 4.150 | 1F   | X           | X         |           | X          |             |           |
| 3.046 | 2F   | X           |           | X         | X          |             |           |
| 2.313 | 3F   | X           | X         |           |            | X           |           |
| 1.853 | 4F   | X           |           | X         |            | X           |           |
| 1.000 | 5F   | X           | X         | X         |            |             |           |
| -2.420| 1R   |             | X         |           | X          |             | X         |
| -1.683| 2R   |             | X         |           |            | X           | X         |
| -1.221| 3R   |             |           | X         | X          |             | X         |
| -.743 | 4R   |             |           | X         |            | X           | X         |

FIG. 3

|  |  | Clutches | | | Brakes | | |
|---|---|---|---|---|---|---|---|
| Ratio | Gear | Second (76) | First (75) | Third (77) | Third (74) | Second (73) | First (72) |
| 4.235 | 1F | X |  | X | X |  |  |
| 3.184 | 2F | X | X |  | X |  |  |
| 2.394 | 3F | X |  | X |  | X |  |
| 1.800 | 4F | X | X |  |  | X |  |
| 1.000 | 5F | X | X | X |  |  |  |
| -2.412 | 1R |  |  | X | X |  | X |
| -1.720 | 2R |  |  | X |  | X | X |
| -1.230 | 3R |  | X |  | X |  | X |
| -.750 | 4R |  | X |  |  | X | X |

FIG. 14

CONFIGURATION FOR COMPACT PLANETARY TRANSMISSION

TECHNICAL FIELD OF THE DISCLOSURE

The present disclosure relates to mechanical power transmission and, more particularly, relates to a compact and efficient 5-forward/4-reverse transmission.

BACKGROUND OF THE DISCLOSURE

Because most power sources have a limited range of output RPM, machines employing such power sources will also typically employ a multispeed transmission to provide a greater range of machine speed. One type of multispeed transmission is the planetary transmission. Such a transmission generally includes many planetary gear sets linked together in various ways, with selectable elements used to select the input/output ratio.

However, planetary gear sets take up a significant amount of space, and it is typically required to either settle for a limited number of gear ranges or allow for a greater installation footprint to include a greater number of planetary gear sets. For example, U.S. Pat. No. 7,963,876 to Phillips minimizes the number of planetary gear sets used, but also provides only three reverse speeds. The transmission described in the Phillips patent includes four planetary gear sets and various clutches and brakes. The clutches and brakes are selectively engageable to provide different speed ratios, but only a three reverse speed ratios are enabled. Thus, while up to seven forward speeds are shown, fewer than half as many reverse ratios are available within the Phillips system.

The present disclosure is directed to a system that addresses one or more of the problems set forth above. However, it should be appreciated that the solution of any particular problem is not a limitation on the scope of this disclosure nor of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In accordance with one aspect of the present disclosure, a machine power transmission is provided having a planetary gear train with exactly four planetary gear sets including a first planetary gear set having a first sun gear, first ring gear, and first carrier, a second planetary gear set having a second sun gear, second ring gear, and second carrier, a third planetary gear set having a third sun gear, third ring gear, and third carrier, and a fourth planetary gear set having a fourth sun gear, fourth ring gear, and fourth carrier. The machine power transmission also includes an input to the planetary gear train and an output from the planetary gear train, as well as a first brake, second brake, third brake, first clutch, second clutch and third clutch associated with the planetary gear train, the first brake, second brake, third brake, first clutch, second clutch and third clutch being linked to the planetary gear train such that selective actuation of one or more of the first brake, second brake, third brake, first clutch, second clutch and third clutch provides five forward speeds and a four reverse speeds of the transmission.

In accordance with another aspect of the present disclosure, a planetary gear train is provided, having first, second, third, and fourth planetary gear sets between an input and an output, and first, second, and third brakes and first, second and third clutches. The first, second, and third brakes and first, second and third clutches are selectively actuatable to provide five different forward speeds and four different reverse speeds between the input and the output.

In accordance with yet another aspect of the present disclosure, a compact transmission is provided having five forward speeds and four reverse speeds. The compact transmission has four planetary gear sets, and also includes three brakes for braking one or more elements of the planetary gear sets, and three clutches for interconnecting one or more elements of the planetary gear sets.

Other features and advantages of the disclosed systems and principles will become apparent from reading the following detailed disclosure in conjunction with the included drawing figures.

BRIEF DESCRIPTION OF THE DRAWINGS

FIG. 3 is a gear ratio chart showing ratios as well as clutch and brake activation patterns for each gear in accordance with the transmission of FIG. 2;

FIG. 14 is a gear chart for clutch and brake activation relative to the arrangement shown in FIG. 13.

DETAILED DESCRIPTION OF THE DISCLOSURE

The present disclosure provides a configuration for a compact five-speed planetary transmission. The transmission in an embodiment includes four planetary gear sets configured via three static clutches (also referred to herein as brakes) and three rotating clutches. In an embodiment, these elements are located such that selective activation provides five forward speeds as well as four reverse speeds.

Figure 1:
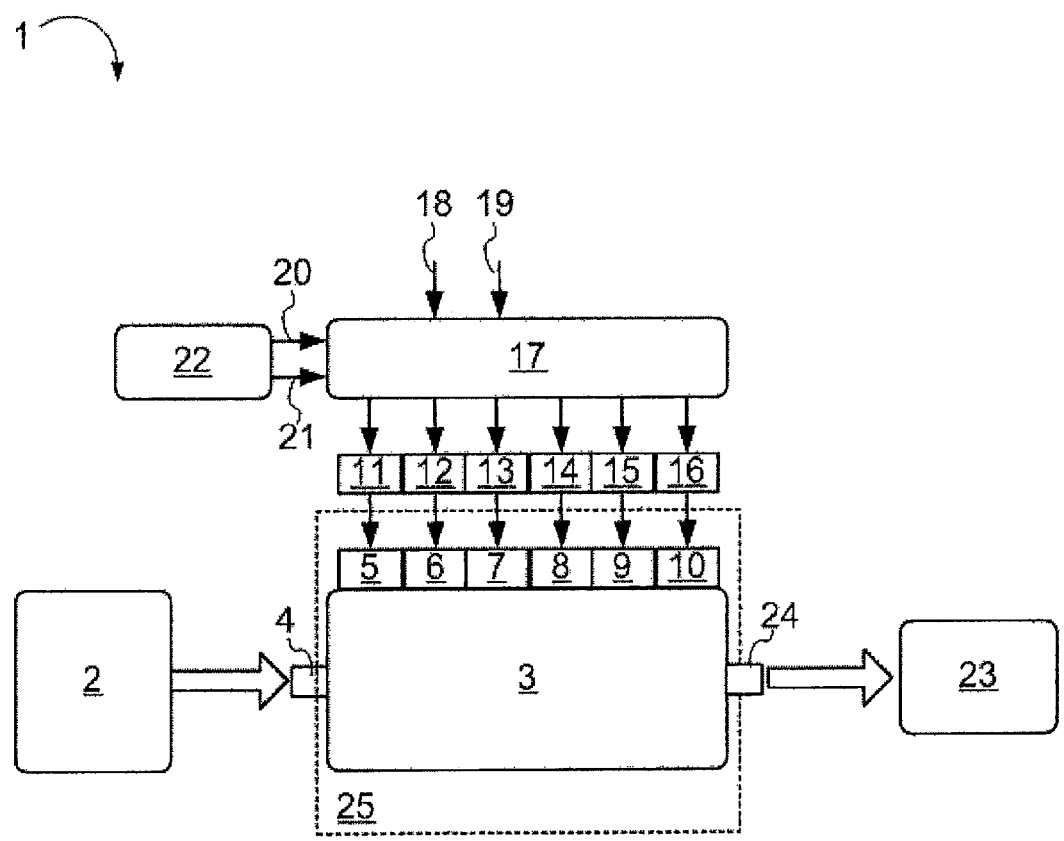
FIG. 1 is a schematic diagram of a transmission system and associated systems in keeping with an embodiment of the described principles.

Having discussed various embodiments in overview, we turn now to detailed descriptions of certain embodiments. FIG. 1 is a system schematic showing input, output, and control structures of a machine power system 1 in accordance with an embodiment. In the illustrated configuration, the machine power system 1 includes a power input device 2, which may be an engine such as a fuel-burning engine (gas, diesel, propane, LNG, kerosene, etc.) or a motor, e.g., an electric or hydraulic motor.

The power input device 2 is linked into a planetary gear set 3 via an input shaft 4. The state of the planetary gear set 3 (e.g., the output speed and direction of the planetary gear set 3) is controlled by a first brake 5, second brake 6, third brake 7, first clutch 8, second clutch 9 and third clutch 10. The planetary gear set 3, first brake 5, second brake 6, third brake 7, first clutch 8, second clutch 9 and third clutch 10 may be referred to collectively as the transmission 25.

Each brake and clutch is controlled by a control element such as an electronic solenoid valve, such that the machine power system 1 includes a first solenoid 11, second solenoid 12, third solenoid 13, fourth solenoid 14, fifth solenoid 15 and sixth solenoid 16 linked to the first brake 5, second brake 6, third brake 7, first clutch 8, second clutch 9 and third clutch 10 respectively.

A controller 17 is connected and configured to control each of the first solenoid 11, second solenoid 12, third solenoid 13, fourth solenoid 14, fifth solenoid 15 and sixth solenoid 16. In an embodiment, the controller 17 actuates the solenoids to set the state of the planetary gear set 3 in response to a plurality of inputs. In the illustrated embodiment, the plurality of inputs includes a speed input 18 from the power input device 2, and the controller 17 may also provide an acceleration output 19 to the power input device. The plurality of inputs further includes an acceleration input 20 and a direction input 21, both from a user interface module 22.

The user interface module 22 may be an interface to personnel in a machine cab or may be an interface to another electronic system, e.g., for remote control or autonomous operation. The controller 17 in an embodiment is a digital processor operating in accordance with computer-executable instructions and data read from one or more non-transitory computer-readable media, e.g., a volatile or nonvolatile memory associated with controller 17. The volatile or nonvolatile memory associated with controller 17 may include a flash drive, optical drive, magnetic drive and/or other appropriate memory device.

The planetary gear set 3 provides power to a final drive 23 via an output shaft 24, with the speed range and direction of the rotation of the output shaft 24 being set by the controller 17 via setting of the first solenoid 11, second solenoid 12, third solenoid 13, fourth solenoid 14, fifth solenoid 15 and sixth solenoid 16.

Figure 2:
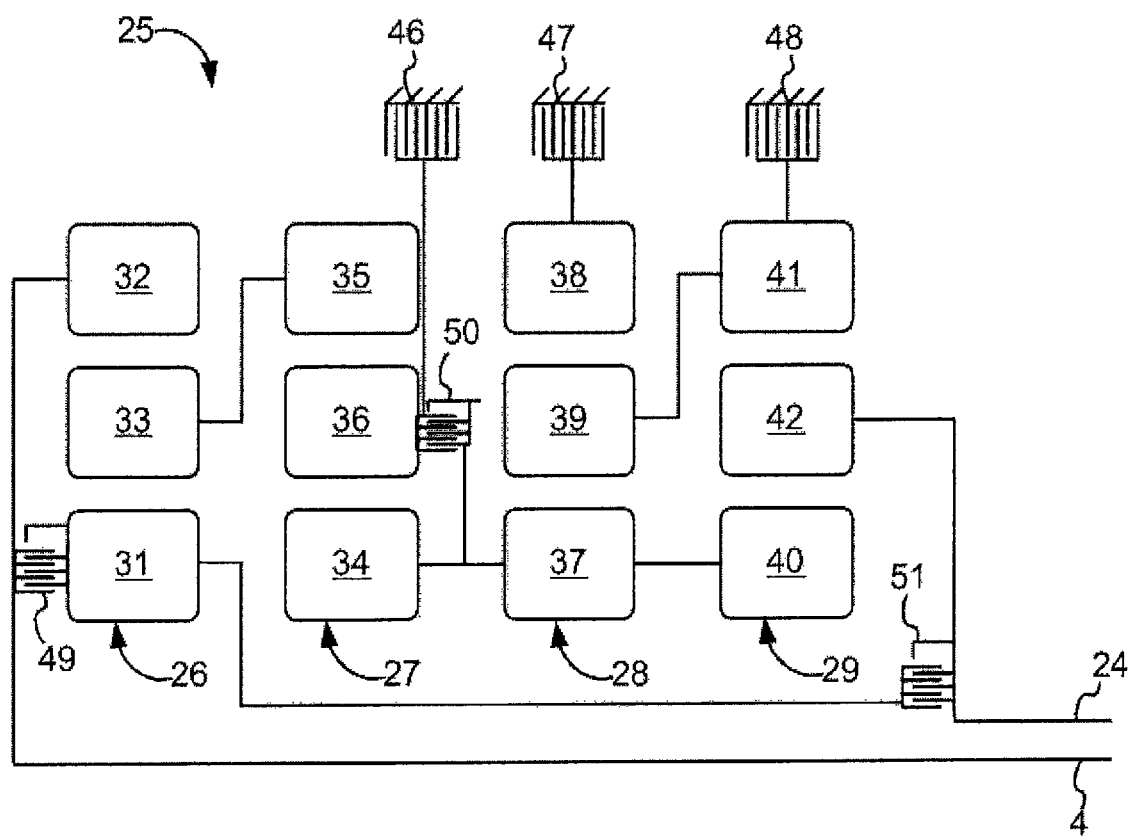
FIG. 2 is a planetary gear set diagram showing a transmission system in accordance with an embodiment of the described principles.

As will be seen from FIG. 2, the illustrated transmission 25 is implemented in an embodiment as a compact planetary gear system having four individual interconnected planetary gear sets. In particular, the transmission 25 as illustrated includes a first planetary gear set 26, a second planetary gear set 27, a third planetary gear set 28, and a fourth planetary gear set 29. Each planetary gear set includes a sun gear, ring gear and carrier.

Thus, the first planetary gear set 26 comprises a first sun gear 31, a first ring gear 32, and a first carrier 33; the second planetary gear set 27 includes a second sun gear 34, a second ring gear 35, and a second carrier 36; the third planetary gear set 28 includes a third sun gear 37, a third ring gear 38, and a third carrier 39; and the fourth planetary gear set 29 includes a fourth sun gear 40, a fourth ring gear 41, and a fourth carrier 42.

As noted above, the transmission 25 in an embodiment also includes a plurality of brakes and clutches. In the illustrated configuration, a first brake 46 is linked to the second carrier 36 of the second planetary gear set 27, a second brake 47 is linked to the third ring gear 38 of the third planetary gear set 28, and a third brake 48 is linked to the fourth ring gear 41 of the fourth planetary gear set 29. Each brake 46, 47, 48 is configured to selectively tie the associated component to the transmission case or other static structure and thus limit the rotation of the associated component.

Moreover, in the illustrated configuration, a first clutch 49 is linked to the first sun gear 31 of the first planetary gear set 26, a second clutch 50 is linked to the second carrier 36 of the second planetary gear set 27, and a third clutch 51 is linked to the first sun gear 31 of the first planetary gear set 26.

The first clutch 49 is selectively actuatable to link the first sun gear 31 of the first planetary gear set 26 to the first ring gear 32 of the same planetary gear set. The second clutch 50 is selectively actuatable to link the second carrier 36 to the second sun gear 34 of the same planetary gear set and to the third sun gear 37 of third planetary gear set 28, which is also linked to the fourth sun gear 40 of the fourth planetary gear set 29. The third clutch 51 is selectively actuatable to link the first sun gear 31 of the first planetary gear set 26 to the fourth carrier 42 of the fourth planetary gear set 29 and to output 24.

In operation, selective actuation of one or more of the first brake 46, second brake 47, third brake 48, first clutch 49, second clutch 50 and third clutch 51 serves to place the transmission 25 into a selected state, e.g., one of five forward speeds or one of four reverse speeds. The chart 55 of FIG. 3 shows the corresponding states for selective actuation in the illustrated embodiment. As can be seen, the first brake 46, second brake 47, third brake 48, first clutch 49, second clutch 50 and third clutch 51 are actuated in various patterns to select a gear ratio and transmission direction. In particular, the second clutch 50 and first brake 46 are actuated on a mutually exclusive basis to select a transmission direction while the remaining clutches and brakes are used to select a gear ratio within the set direction.

In the illustrated embodiment, the following associations of [Ratio, Gear, Second Clutch, Third Clutch, First Clutch, Third Brake, Second Brake, First Brake] respectively are exhibited: [4.150, 1F, On, On, Off, On, Off, Off]; [3.046, 2F, On, Off, On, On, Off, Off]; [2.313, 3F, On, On, Off, On, Off]; [1.853, 4F, On, Off, On, Off, On, Off]; [1.000, 5F, On, On, On, Off, Off, Off]; [−2.420, 1R, Off, On, Off, On, Off, On]; [−1.683, 2R, Off, On, Off, Off, On, On]; [−1.221, 3R, Off, Off, On, On, Off, On]; and [−0.743, 4R, Off, Off, On, Off, On, On].

It will be appreciated that the power flow through the transmission 25 depends upon the selected direction and ratio. Thus, for each selectable gear 1F, 2F, 3F, 4F, 5F, 1R, 2R, 3R, and 4R, the power flow through the transmission 25 is shown in respective ones of the power flow diagrams included in FIGS. 4-12.

Figure 4:
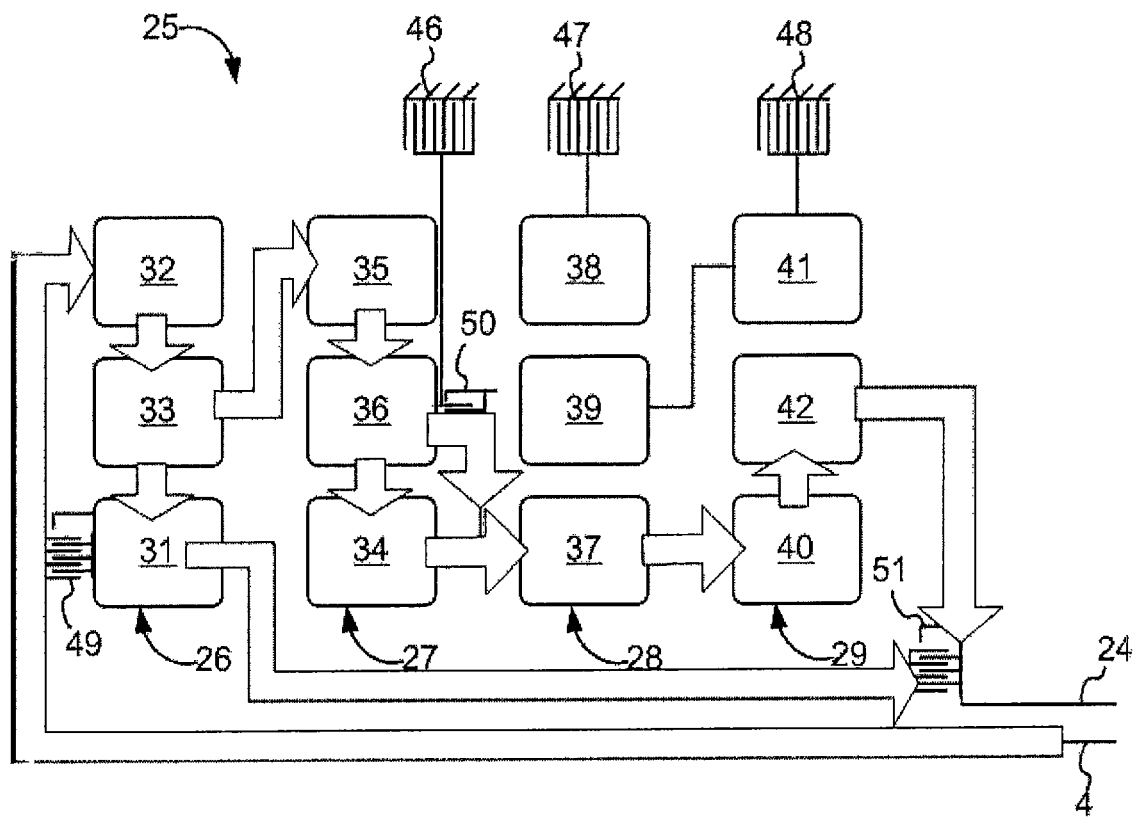
FIG. 4 is a power flow diagram showing the power flow in the transmission of FIG. 2 in a 1F configuration.

FIG. 4 thus shows the power flow through the transmission 25 when the transmission is in the 1F state (first forward gear). The states of the [Second Clutch, Third Clutch, First Clutch, Third Brake, Second Brake, First Brake] respectively are [On, On, Off, On, Off, Off] in this configuration.

Figure 5:
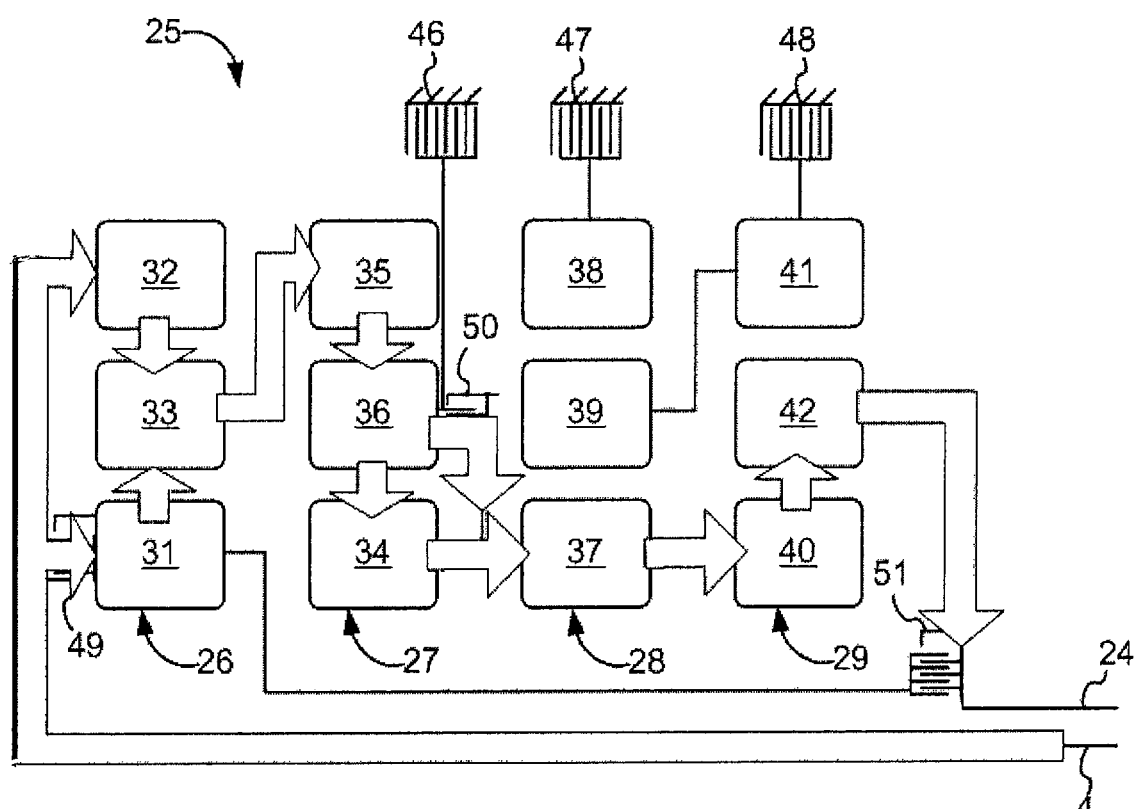
FIG. 5 is a power flow diagram showing the power flow in the transmission of FIG. 2 in a 2F configuration.

FIG. 5 shows the power flow through the transmission 25 when the transmission is in the 2F state (second forward gear). The states of the [Second Clutch, Third Clutch, First Clutch, Third Brake, Second Brake, First Brake] in this configuration are [On, Off, On, On, Off, Off] respectively.

Figure 6:
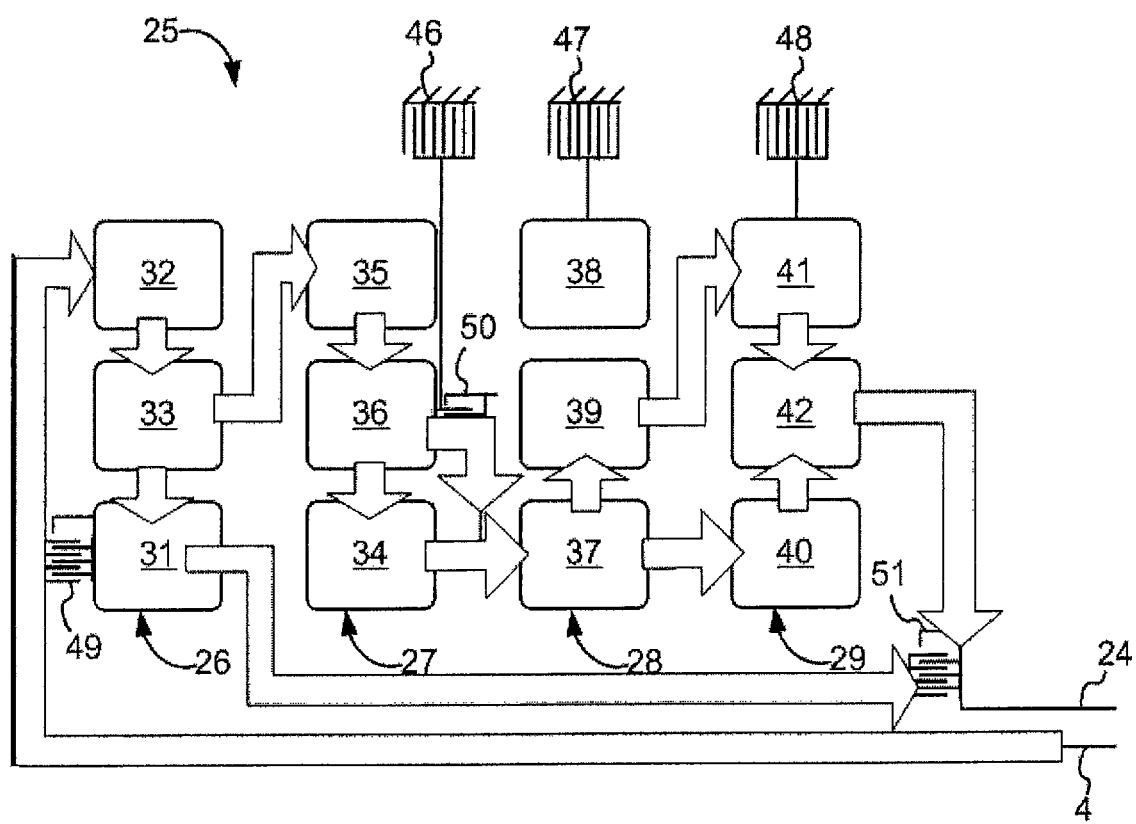
FIG. 6 is a power flow diagram showing the power flow in the transmission of FIG. 2 in a 3F configuration.

Shown in FIG. 6 is the power flow through the transmission 25 when the transmission is in the 3F state (third forward gear). The states of the [Second Clutch, Third Clutch, First Clutch, Third Brake, Second Brake, First Brake] in this state are [On, On, Off, Off, On, Off] respectively.

Figure 7:
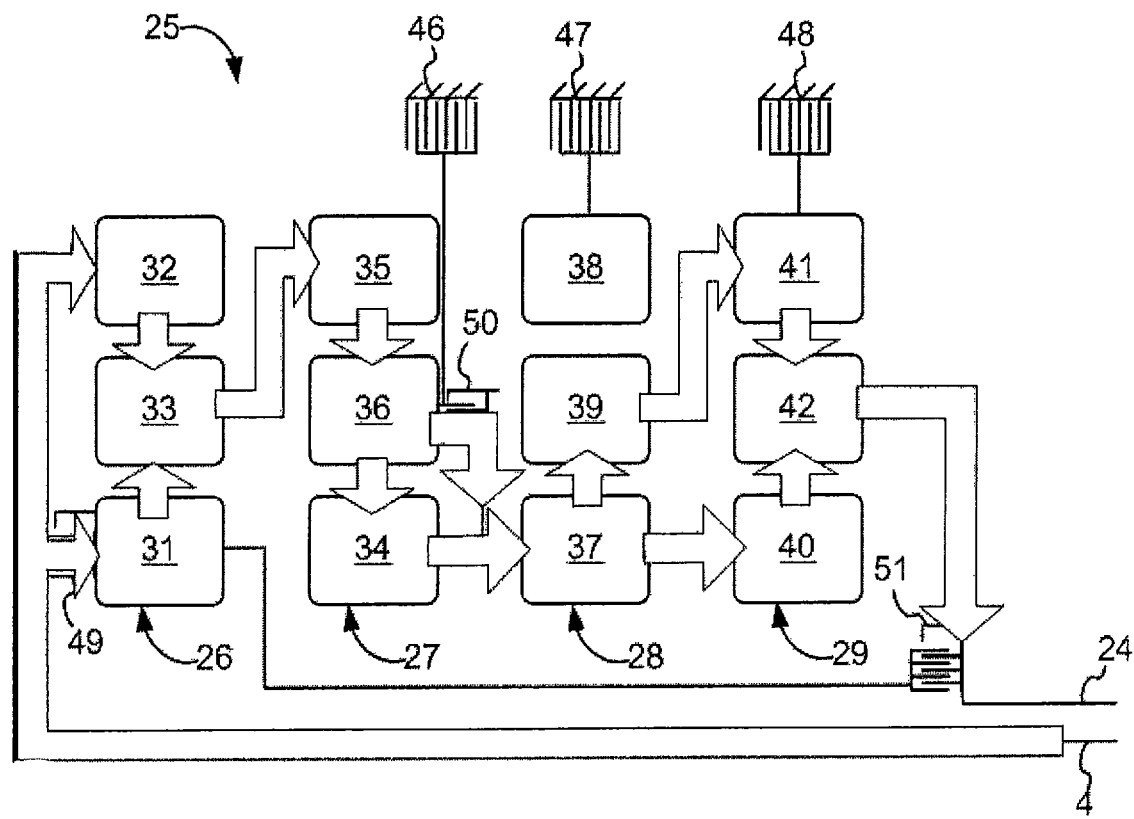
FIG. 7 is a power flow diagram showing the power flow in the transmission of FIG. 2 in a 4F configuration.

The power flow diagram of FIG. 7 illustrates the power flow through the transmission 25 when the transmission is in the 4F state (fourth forward gear). The states of the [Second Clutch, Third Clutch, First Clutch, Third Brake, Second Brake, First Brake] in this state are [On, Off, On, Off, On, Off] respectively.

Figure 8:
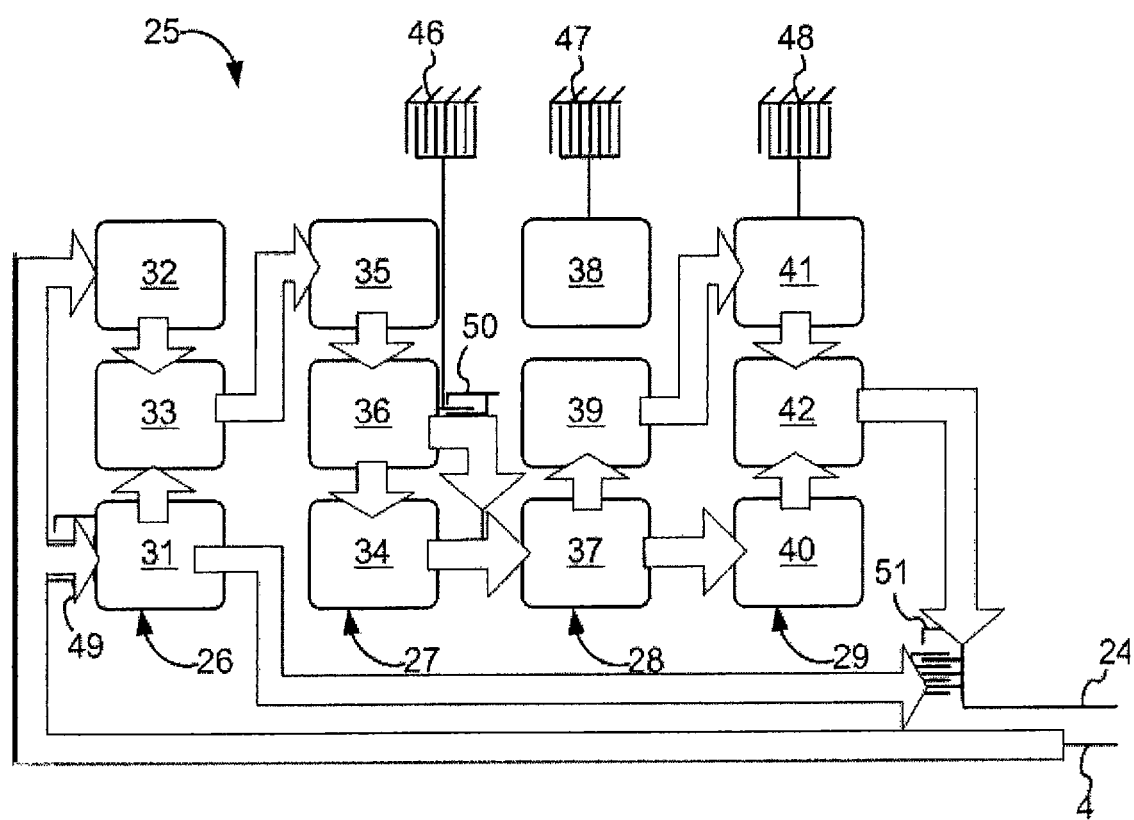
FIG. 8 is a power flow diagram showing the power flow in the transmission of FIG. 2 in a 5F configuration.

For the final forward state, 5F, FIG. 8 shows the power flow through the transmission 25. The states of the [Second Clutch, Third Clutch, First Clutch, Third Brake, Second Brake, First Brake] in this state are [On, On, On, Off, Off, Off] respectively.

Figure 9:
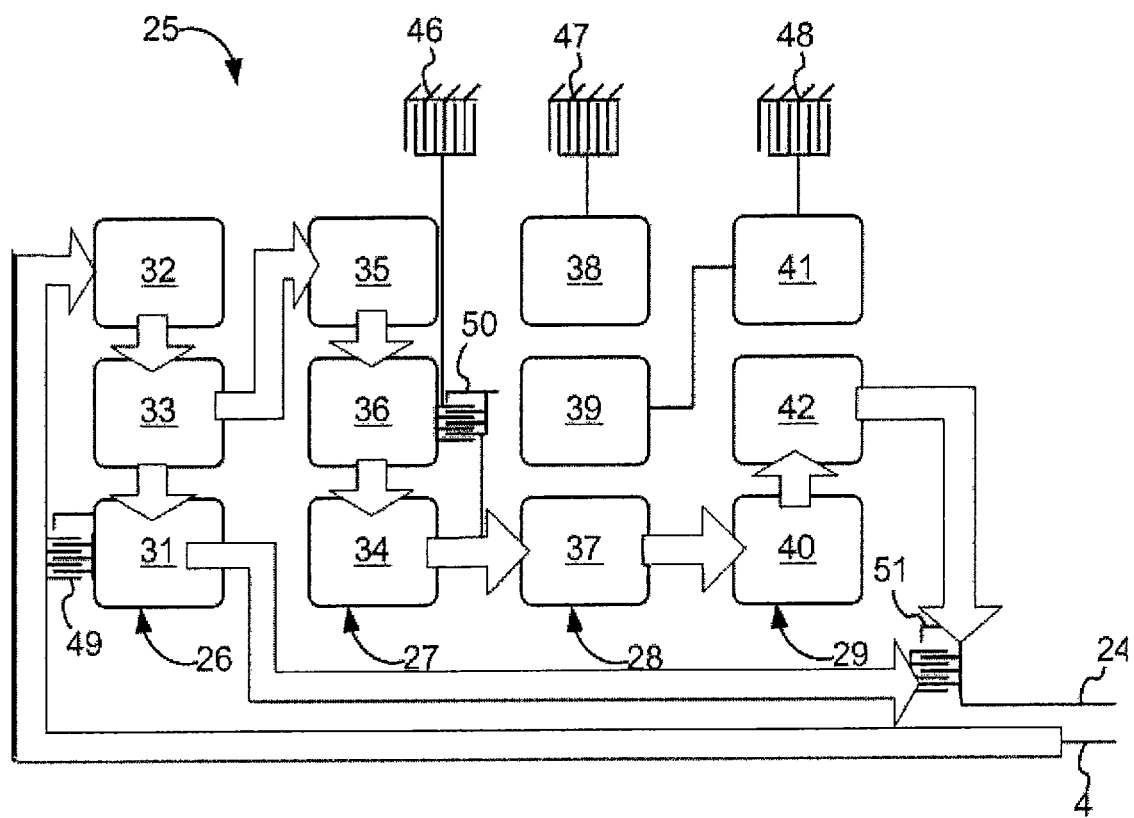
FIG. 9 is a power flow diagram showing the power flow in the transmission of FIG. 2 in a 1R configuration.

Having reviewed the power flow in each of the forward gears, the power flow in each reverse gear will be shown. FIG. 9 illustrates the power flow through the transmission 25 when the transmission is in the 1R state (first reverse gear). The states of the [Second Clutch, Third Clutch, First Clutch, Third Brake, Second Brake, First Brake] in this state are [Off, On, Off, On, Off, On] respectively.

Figure 10:
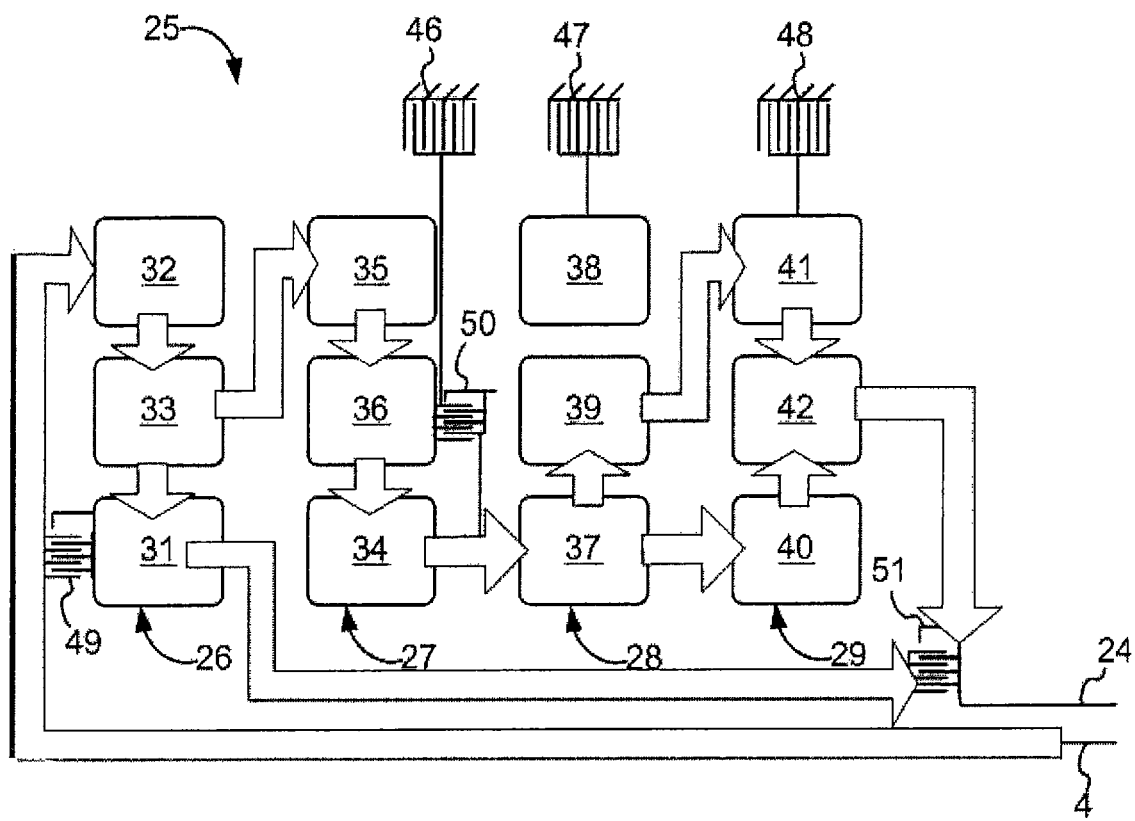
FIG. 10 is a power flow diagram showing the power flow in the transmission of FIG. 2 in a 2R configuration.

The power flow through the transmission 25 when the transmission is in the 2R state (second reverse gear) is shown in FIG. 10. The states of the [Second Clutch, Third Clutch, First Clutch, Third Brake, Second Brake, First Brake] in this configuration are [Off, On, Off, Off, On, On] respectively.

Figure 11:
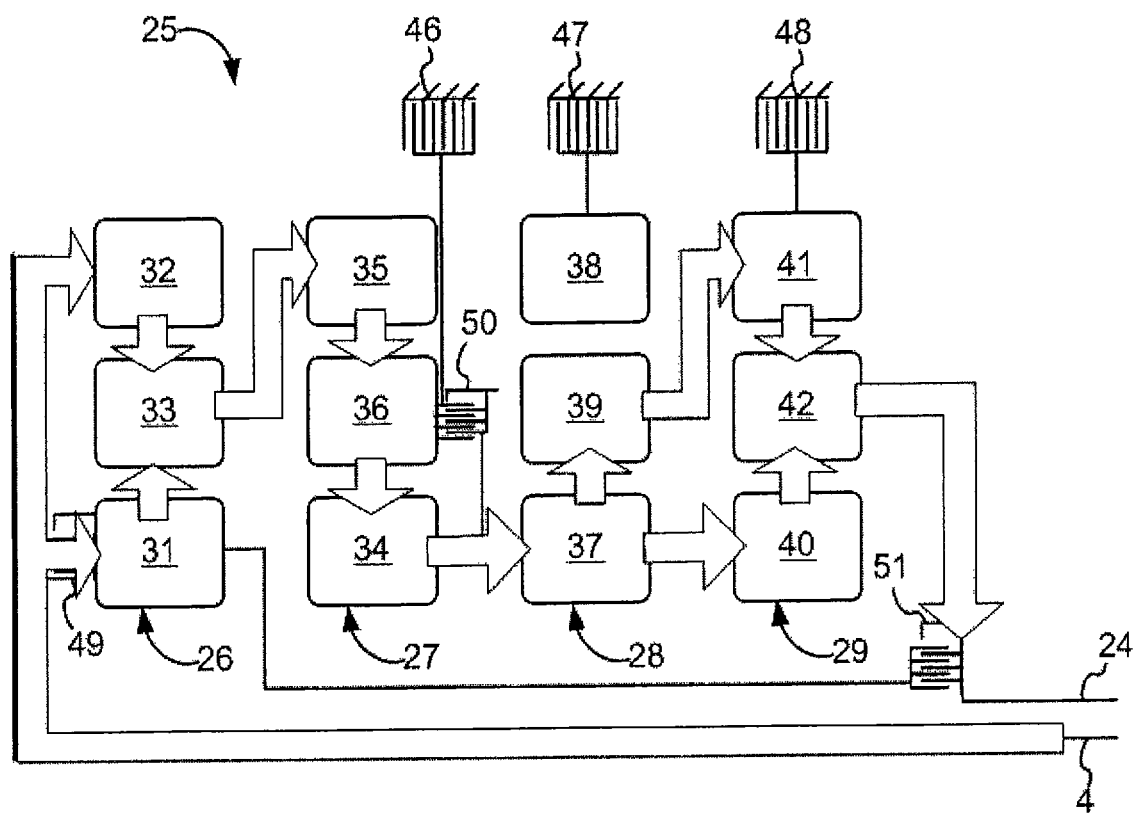
FIG. 11 is a power flow diagram showing the power flow in the transmission of FIG. 2 in a 3R configuration.

In the 3R state (third reverse gear), all four planetary gear sets are again involved in the power flow as shown in FIG. 11. In this state, the configurations of the [Second Clutch, Third Clutch, First Clutch, Third Brake, Second Brake, First Brake] are [Off, Off, On Off, On, On] respectively.

Figure 12:
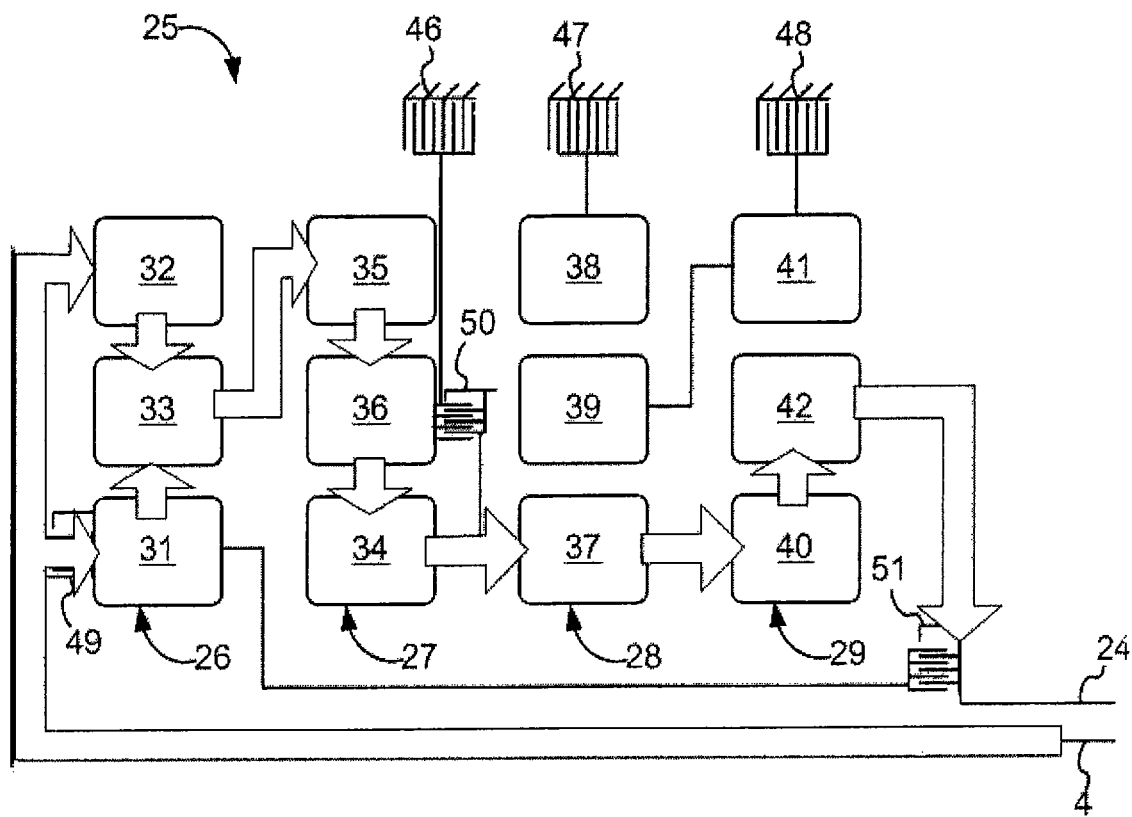
FIG. 12 is a power flow diagram showing the power flow in the transmission of FIG. 2 in a 4R configuration.

The power flow through the transmission 25 in the final reverse state 4R (fourth reverse gear) is shown in the power flow diagram of FIG. 12. In this state, the configurations of the [Second Clutch, Third Clutch, First Clutch, Third Brake, Second Brake, First Brake] are [Off, Off, On, Off, On, On] respectively.

It will be appreciated that the precise input/output ratio in each state will depend upon the e-value of each planetary gear set, the e-value being the ratio of the number of teeth on the ring gear to the number of teeth on the associated sun gear. In the embodiment reflected in the state chart of FIG. 3, the e-value for the first planetary gear set is 1.854, the e-value for the second planetary gear set is 2.494, the e-value for the third planetary gear set is 2.177, and the e-value for the fourth planetary gear set is 2.046. Those of skill in the art will understand that other planetary gear set e-values may be used to change one or more of the gear ratios shown in FIG. 3.

Moreover, it will be appreciated that the described principles include trivial variants. For example, the illustrated design has two trivial clutch variants each for the first clutch 49 and the third clutch 51. With three choices for the first clutch 49 and three choices for the third clutch 51 there exist a total of 9 combinations. To be more specific, the first clutch 49 is illustrated linking the first sun gear 31 to the first ring gear 32. However, suitable variants include linking the first sun gear 31 to the first carrier 33, and linking the first ring gear 32 to the second ring gear 35. The illustrated linking is preferred in an embodiment because the variant requires a double planetary set.

Figure 13:
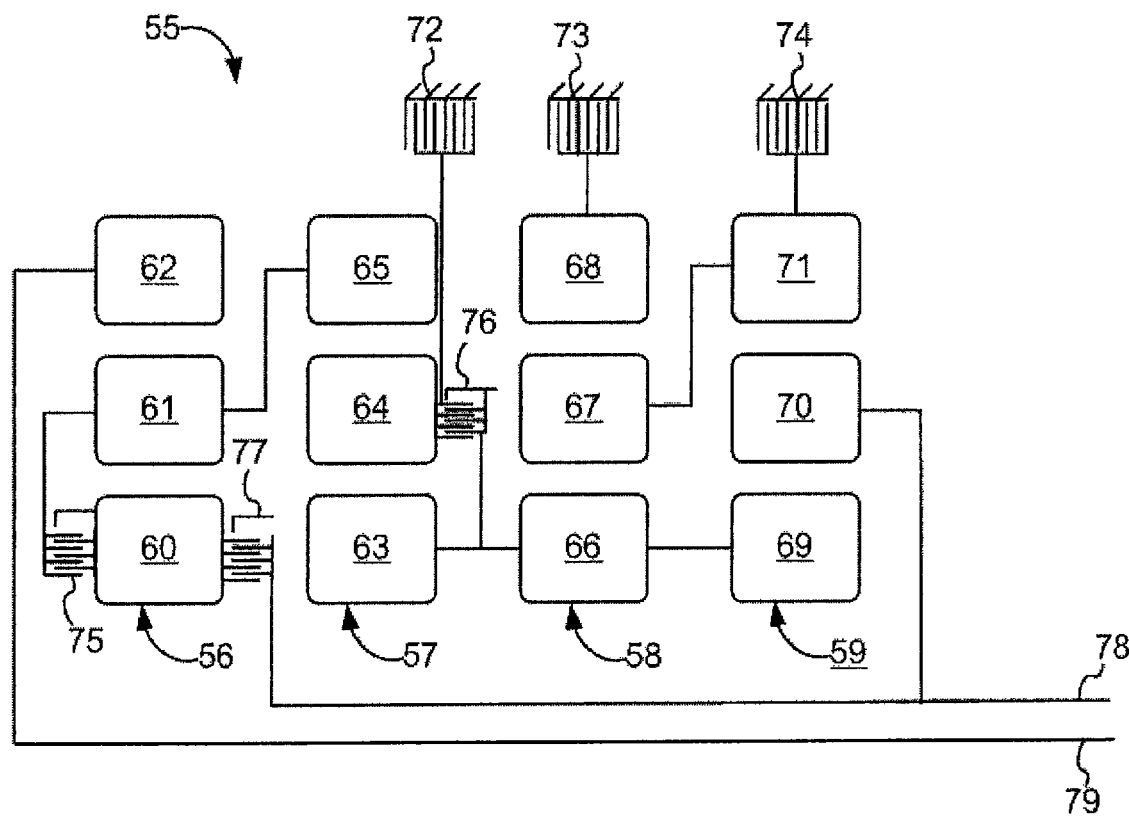
FIG. 13 is a schematic diagram of a variant arrangement in accordance with an alternative embodiment.

Another variant arrangement 55 is reflected in the schematic diagram of FIG. 13 and the corresponding gear chart of FIG. 14. As can be seen, the variant arrangement 55 includes a first planetary gear set 56, a second planetary gear set 57, a third planetary gear set 58, and a fourth planetary gear set 59. Each planetary gear set 56, 57, 58, 59 has a respective sun gear, carrier, and ring gear, such that the variant arrangement 55 includes a first sun gear 60, first carrier 61, first ring gear 62, second sun gear 63, second carrier 64, second ring gear 65, third sun gear 66, third carrier 67, third ring gear 68, fourth sun gear 69, fourth carrier 70, and fourth ring gear 71.

As with the original configuration, this variant 55 includes a first brake 72, second brake 73, third brake 74, first clutch 75, second clutch 76 and third clutch 77. However, in this variant 55, the first clutch 75 has been moved to selectively tie the first sun gear 60 to the first carrier 61.

The respective ratios between the input 79 and output 78 for each gear are shown in the gear chart of FIG. 14, along with the brake and clutch settings required to provide the listed gear. In an embodiment, the e-values of the first planetary gear set 56, second planetary gear set 57, third planetary gear set 58, and fourth planetary gear set 59 are 1.854, 2.494, 2.177, and 2.046 respectively. It will be appreciated that other e-values and thus other gear ratios may be used instead.

INDUSTRIAL APPLICABILITY

In general terms, the present disclosure sets forth a compact 5-forward/4-reverse transmission applicable to any machine wherein a compact space requirement exists and the indicated number and direction of gears are needed. The described system operates by the selective actuation of three brakes and three rotational clutches. The system is divided in the sense that one clutch and one brake serve as mutually exclusive directional selectors, although the system does not necessarily employ a distinct speed portion and distinct direction portion. The resultant system provides compact installation and efficient operation. In addition, the close step of the resultant system allows direct drive shifts in the working range.

It will be appreciated that the present disclosure provides a new and useful transmission for use in a variety of machines. While only certain embodiments have been set forth, alternatives and modifications will be apparent from the above description to those skilled in the art. These and other alternatives are considered equivalents and within the spirit and scope of this disclosure and the appended claims.

What is claimed is:
1. A machine power transmission comprising:
a planetary gear train having exactly four planetary gear sets including a first planetary gear set having a first sun gear, first ring gear, and first carrier, a second planetary gear set having a second sun gear, second ring gear, and second carrier, a third planetary gear set having a third sun gear, third ring gear, and third carrier, and a fourth planetary gear set having a fourth sun gear, fourth ring gear, and fourth carrier;
an input to the planetary gear train and an output from the planetary gear train; and
a first brake, second brake, third brake, first clutch, second clutch and third clutch associated with the planetary gear train, the first brake, second brake, third brake, first clutch, second clutch and third clutch being linked to the planetary gear train such that selective actuation of three of the first brake, second brake, third brake, first clutch, second clutch and third clutch provides five forward speeds and four reverse speeds of the transmission, wherein the first brake is linked to the second carrier and configured to selectively tie the second carrier to a first static structure to limit the rotation of the second carrier, wherein the second brake is linked to the third ring gear and configured to selectively tie the third ring gear to a second static structure to limit the rotation of the third ring gear, and wherein the third brake is linked to the fourth ring gear and configured to selectively tie the fourth ring gear to a third static structure to limit the rotation of the fourth ring gear.

2. The machine power transmission in accordance with claim 1, wherein one of the clutches and one of the brakes serve as mutually exclusive directional selectors to select an output direction of the transmission.

3. The machine power transmission in accordance with claim 1, wherein the third clutch is selectively actuatable to link the first sun gear to the fourth carrier and to the planetary gear train output.

4. The machine power transmission in accordance with claim 1, wherein the first clutch is selectively actuatable to link the first sun gear to the planetary gear train input.

5. The machine power transmission in accordance with claim 1, wherein the second clutch is selectively actuatable to link the second carrier to the second, third and fourth sun gears.

6. The machine power transmission in accordance with claim 1, wherein the first, second and third static structures are the same static structure.

7. A planetary gear train comprising:
   first, second, third, and fourth planetary gear sets between an input and an output, wherein the first planetary gear set includes a first sun gear, first ring gear, and first carrier, the second planetary gear set includes a second sun gear, second ring gear, and second carrier, the third planetary gear set includes a third sun gear, third ring gear, and third carrier, and the fourth planetary gear set includes a fourth sun gear, fourth ring gear, and fourth carrier; and
   first, second, and third brakes and first, second and third clutches, the first, second, and third brakes and first, second and third clutches being selectively actuatable to provide five different forward speeds and four different reverse speeds between the input and the output, wherein the first clutch is selectively actuatable to link the first sun gear to the first ring gear and the input of the planetary gear train, wherein the second clutch is selectively actuatable to link the second carrier to the second and third sun gears, and wherein the third clutch is selectively actuatable to link the output of the planetary gear train to the first sun gear.

8. The planetary gear train in accordance with claim 7, wherein one of the clutches and one of the brakes serve as mutually exclusive directional selectors to select an output direction of the planetary gear train.

9. The planetary gear train in accordance with claim 7, wherein the first brake and second clutch are activated on a mutually exclusive basis to select an output direction of the planetary gear train.

10. The planetary gear train in accordance with claim 9, wherein the first brake is linked to the second carrier and configured to selectively tie the second carrier to a static structure to limit the rotation of the second carrier.

11. The planetary gear train in accordance with claim 9, wherein the second brake is linked to the third ring gear and configured to selectively tie the third ring gear to a static structure to limit the rotation of the third ring gear.

12. The planetary gear train in accordance with claim 9, wherein the third brake is linked to the fourth ring gear and configured to selectively tie the fourth ring gear to a static structure to limit the rotation of the fourth ring gear.

13. A compact transmission providing five forward speeds and four reverse speeds, the compact transmission including only four planetary gear sets, three brakes for braking one or more elements of the planetary gear sets, and three clutches for interconnecting one or more elements of the planetary gear sets, wherein a first brake of the three brakes is configured to selectively tie a second carrier of a second planetary gear set of the four planetary gear sets to a first static structure to limit the rotation of the second carrier, wherein a second brake of the three brakes is configured to selectively tie a third ring gear of a third planetary gear set of the four planetary gear sets to a second static structure to limit the rotation of the third ring gear, and wherein a third brake of the three brakes is configured to selectively tie a fourth ring gear of a fourth planetary gear set of the four planetary gear sets to a third static structure to limit the rotation of the fourth ring gear.

14. The compact transmission in accordance with claim 13, wherein the first brake and a second clutch of the three clutches are activated on a mutually exclusive basis to select an output direction of the compact transmission.

15. The compact transmission in accordance with claim 13, wherein the first, second and third static structures are the same static structure.

* * * * *

UNITED STATES PATENT AND TRADEMARK OFFICE
CERTIFICATE OF CORRECTION

PATENT NO.         : 8,979,702 B2
APPLICATION NO.    : 13/540308
DATED              : March 17, 2015
INVENTOR(S)        : Koch et al.

It is certified that error appears in the above-identified patent and that said Letters Patent is hereby corrected as shown below:

Column 8, line 7, In claim 10, delete "claim 9," and insert -- claim 7, --.

Column 8, line 11, In claim 11, delete "claim 9," and insert -- claim 7, --.

Column 8, line 15, In claim 12, delete "claim 9," and insert -- claim 7, --.

Signed and Sealed this
Twenty-third Day of August, 2016

Michelle K. Lee
*Director of the United States Patent and Trademark Office*